United States Patent [19]

Scholl et al.

[11] Patent Number: 4,845,416

[45] Date of Patent: Jul. 4, 1989

[54] ELECTRONIC VALVE ACTUATOR

[75] Inventors: Rolland D. Scholl, Dunlap; Mike T. Zimmer; William E. Allen, both of Peoria, all of Ill.

[73] Assignee: Caterpillar Inc., Peoria, Ill.

[21] Appl. No.: 14,325

[22] Filed: Feb. 13, 1987

[51] Int. Cl.[4] .......................................... G05B 19/29
[52] U.S. Cl. .................................. 318/600; 251/30.01; 364/167.01
[58] Field of Search ................... 251/25–30.01, 251/266, 129.01, 129.04, 129.05; 318/506, 560, 561, 565, 569, 572, 590, 615–618, 600–603, 663; 364/162, 174, 474

[56] References Cited

U.S. PATENT DOCUMENTS

| 1,577,177 | 1/1926 | Conrader | 251/266 |
|---|---|---|---|
| 4,216,415 | 8/1980 | Shimonou et al. | 318/600 |
| 4,291,262 | 9/1981 | Nakajima | 318/603 |
| 4,485,338 | 11/1984 | Matsuura et al. | 318/600 |
| 4,549,261 | 10/1985 | Al Mouhamed | 318/600 |
| 4,549,271 | 10/1985 | Nozawa et al. | 318/603 |
| 4,591,969 | 5/1986 | Bloom et al. | 318/603 |
| 4,609,176 | 9/1986 | Powers | 251/25 |

Primary Examiner—William M. Shoop, Jr.
Assistant Examiner—David Martin
Attorney, Agent, or Firm—Terry D. Morgan; Michael G. Fletcher; Wei Wei Jeang

[57] ABSTRACT

Apparatus is provided for mechanically actuating a valve stem in response to signals generated by an electronic control. A signal means and a sensor means send signals to the electronic control in response to a desired valve stem position and a sensed valve stem position, respectively. The electronic control formulates an error signal if the sensed position is not the desired position. A motor receives a control signal in response to the error signal and drives a linkage for moving the valve stem to the desired position.

14 Claims, 3 Drawing Sheets

ELECTRONIC VALVE ACTUATOR

DESCRIPTION

1. Technical Field

This invention relates generally to mechanical actuation of hydraulic valves and more particularly to an electronic control system for controlling the mechanical actuation.

2. Background of the Invention

Hydraulics provide the muscle for most of todays work vehicles. Large valves are positioned in hydraulic circuits to direct and allocate hydraulic fluid to respective hydraulic cylinders. The cylinders, in turn, are typically connected to a work implement to facilitate its movement.

Presently, auxiliary hydraulic systems, called "pilot systems", control the large valves that handle the flow of fluid to the cylinders. Pilot systems usually have their own pumps, hydraulic lines, valves, and controls. These systems can be quite large and expensive. Furthermore, response of main valve spools to control signals from pilot valves is sometimes slow, due to cold or impure hydraulic fluid.

Mechanical linkages have been designed to operate valves. Some linkages are hand operated, while others employ motors. The hand operated linkages typically display poor response time and linkages connecting the operator to remote valves are extremely complex. This renders them of little use as a control for a work vehicle's main valve. Likewise, many types of motors are difficult to control. Linkages can also become quite complex, leading to a higher cost. This combination of control problems and expensive gearing limits the usefulness of such systems. Particularly, valve control systems on work vehicles must combine the qualities of dependability, safety, and simplicity at a reasonable cost.

The present invention is directed to overcoming one or more of the problems as set forth above.

DISCLOSURE OF THE INVENTION

In one aspect of the present invention, an apparatus for positioning a valve stem is provided. A means transfers mechanical power from a motor to the valve stem and displaces the valve stem. Another means produces a signal representative of desired valve stem position. Sensor means determines the position of the valve stem and produces a signal in response to the sensed position. A motor control means receives the sensed position signal and the desired position signal, produces an error signal responsive to a difference between the received signals, and transmits a motor control signal in response to the error signal.

In another aspect of the present invention, an apparatus for positioning a valve stem is provided. A means transfers mechanical power from a motor to the valve stem and displaces the valve stem. Another means produces a signal representative of desired valve stem position. Sensor means determines the position of the valve stem and produces a signal in response to sensed position. A processing means receives the sensed position signal, converts the signals, and the desired position signal and produces an error signal responsive to a difference between the received signals. A driver means transmits a motor control signal to the motor in response to the error signal and adjusts the difference between the position signals to zero.

In yet another aspect of the present invention, an apparatus for positioning an axially moveable valve stem is provided. A motor, which has a stator and a rotor, is positioned in axial relation to the valve stem. A ball screw is connected at one end to a connectable end of the rotor. An substantially circular shaft is connected at one end to the other end of the ball screw. The other end of the shaft is connected to one end of the valve stem. A means prevents rotation of the shaft. Another means produces a signal representative of desired valve stem position. Sensor means determines the position of the valve stem and produces a signal in response to the sensed position. Processing means receives the position signals and produces an error signal responsive to a difference between the received signals. Driver means transmits a motor control signal to the motor in response to the error signal and adjusts the difference between the position signals to zero.

Presently electronics are abounding in our world. They offer vastly increased speed, a greater variety of functions, cost savings, and high reliability, as compared with mechanical and hydraulic alternatives. However, in applications requiring great amounts of mechanical force, electronics fall short of hydraulics in many instances. For instance, a solenoid or motor large enough to operate a bulldozer blade would be much too large and costly to use efficiently on the bulldozer.

Compromises can be made. The force required to operate the large hydraulic valves associated with most large work implements, a task now carried out by pilot hydraulic systems, can be efficiently generated by motors. The speed of electronic controls is better utilized controlling a motor than controlling a relatively slow pilot system. In addition to improved response, motorized valve actuators use less power and provide a cost savings in many instances. A higher degree of repeatability is also obtained using motorized valve actuators. Pilot systems have less repeatability, due to variations in hydraulic fluid temperature and viscosity, making accurate positioning of valve stems nearly impossible. Automated functions could be programmed into the electronic control systems for the motorized actuators due to the high repeatability of this type of feedback controlled actuator.

BEST MODE FOR CARRYING OUT THE INVENTION

Figure 1:
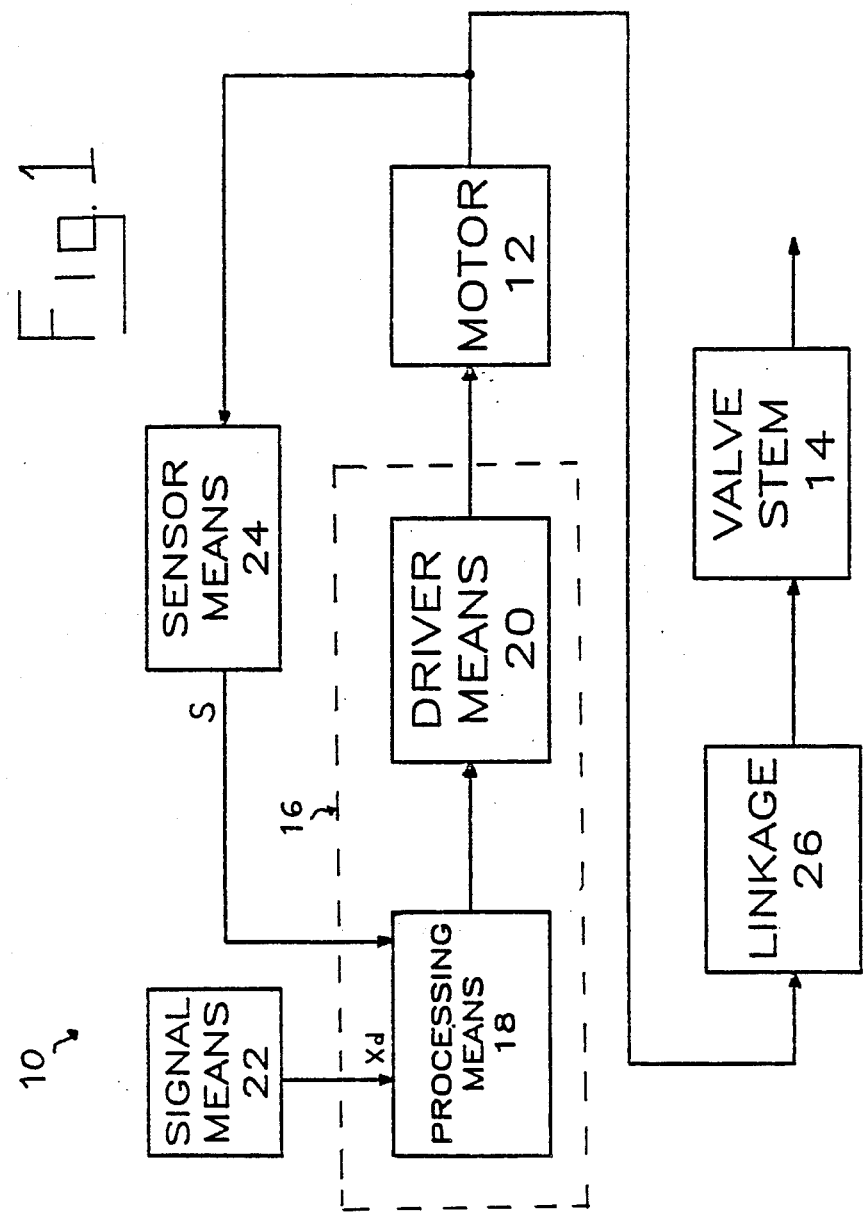
FIG. 1 illustrates a functional diagram of the present invention.

FIG. 1 shows an apparatus 10 including a motor 12 for positioning a valve stem 14. A motor control means 16 includes an analog or digital processing means 18 and a driver means 20. A signal means 22 produces an input signal $X_d$ representative of desired valve stem position which is transmitted to the motor control means 16. A sensor means 24 determines the position of the valve stem 14 and produces a signal, which is transmitted to the motor control means 16, in response to the sensed position. The motor control means 16 converts each received signal into like units. Then the motor control means 16 produces an error signal in response to a difference between the converted position signals and transmits a motor control signal in response to the error signal. The motor 12 receives the motor control signal and transfers its mechanical power via a linkage means 26 to the valve stem 14. Thus, the valve stem 14 is moved. The sensor means 24 continues to feedback position signals to the motor control means 16. As the valve stem moves, the sensed position approaches the desired position thus decreasing the error signal, and in turn decreasing the motor control signal.

Figure 2:
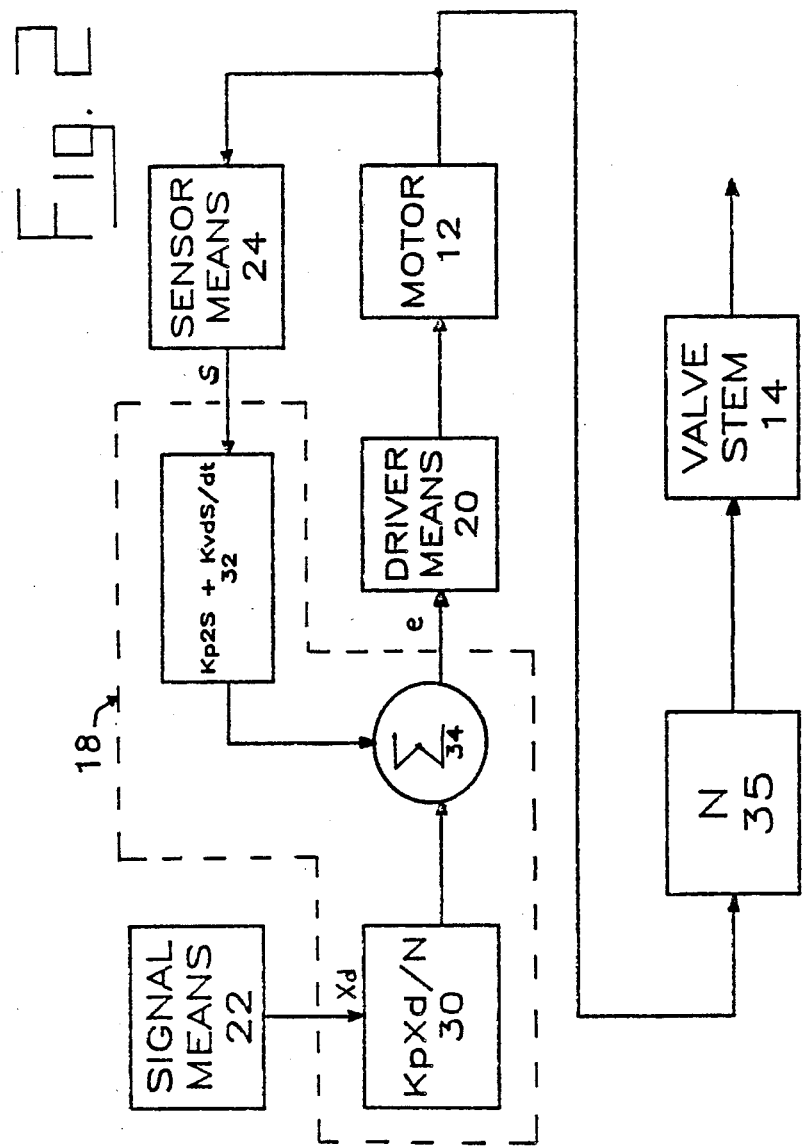
FIG. 2 illustrates a control diagram of the present invention.

Referring now to FIG. 2, a detailed description of the control scheme is presented. Signal means 22, typically a potentiometer or any other linearly variable signal generator, transmits a signal to the processing means 18. The signal is multiplied by the term shown in the block 30. '$K_{p1}$' is a gain constant applied to the position signal, and 'N' is a constant associated with the mechanical linkage 26. 'S' is the input from the sensor means 24 to the processing means 18. As shown in the contents of the block 32, 'S' is multiplied by gain constant '$K_{p2}$', and the derivative of 'S' is multiplied by a velocity gain constant '$K_v$'. Then the converted position and the converted velocity are added together. These calculations not only convert the different input signals into the same units for ease of manipulation, but they also include the position rate of change term, $K_v dS/dt$, which improves controlability and response. The outputs of these two blocks 30,32 are received by the summer 34, as shown, and an error signal 'e' is produced. The error signal is the result of the signal from the block 32 being subtracted from the signal from the other block 30. The error signal includes both magnitude and direction. This signal is received by the driver means 20 and converted into a power signal suitable to operate the motor 12 in either the forward or the reverse direction. Such a motor control signal would normally include a three-phase or four-phase power signal and possibly a commutation signal. The mechanical power from the motor is then converted by the mechanical linkage 26, represented as a constant 'N' in the block 35, to alter the position of the valve stem 14.

Such a control scheme, as described above, can be implemented by either a digital processor, such as a micro- computer, or an analog processor, such as an operational amplifier circuit. Obviously, using a digital processor offers much more flexibility, since software is relatively easy to modify as opposed to a hard-wired circuit.

Figure 3:
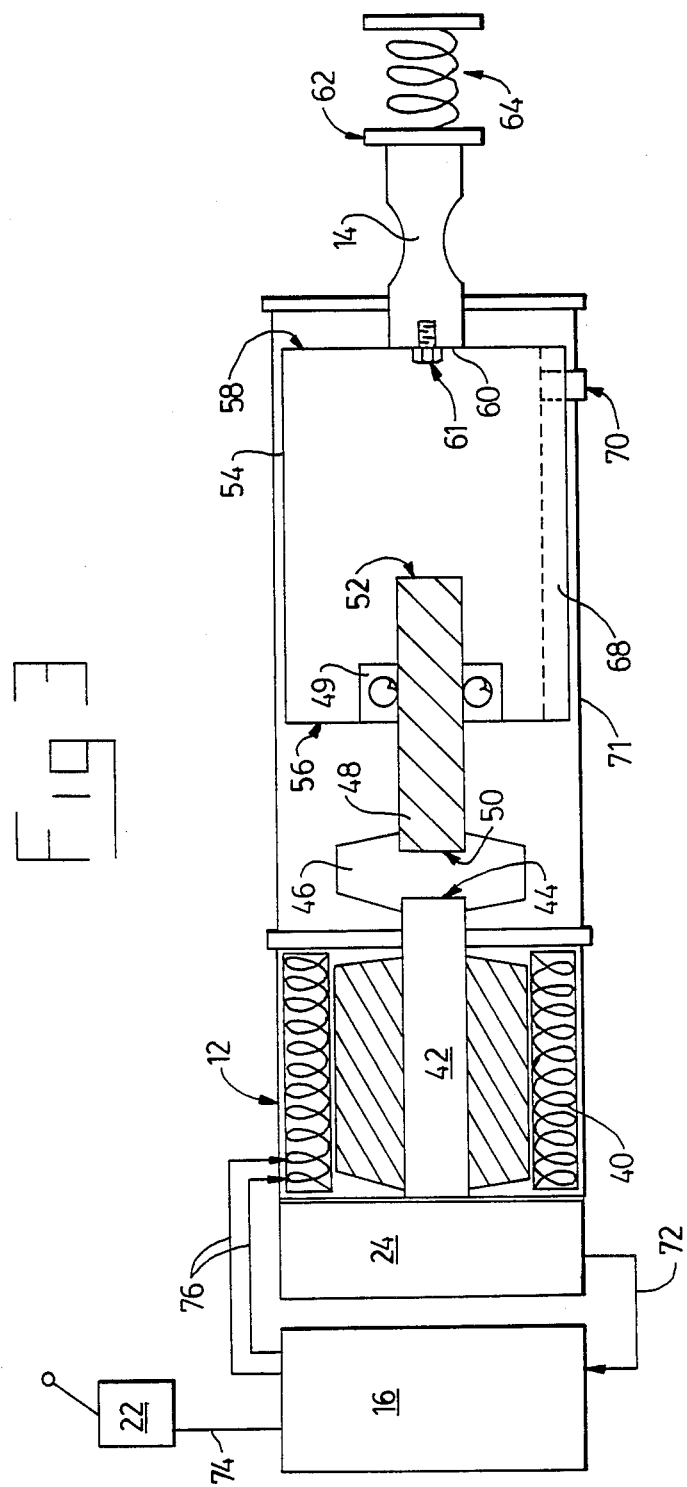
FIG. 3 illustrates a preferred embodiment of the present invention.

Referring now to FIG. 3, a preferred embodiment of the present invention is shown. The motor 12 has a stator 40 and a rotor 42, and is positioned in axial relation to an axially moveable valve stem 14. A ball-screw mechanisim is provided for converting rotory motion into linear motion. The screw 48 portion has a first end 50 and a second end 52. The rotor 42 has a connectable end 44 which is connected via coupling 46 to the first end 50 of the screw 48. A substantially circular shaft 54 has a first end 56 and a second end 58. The ball 49 portion of the ball-screw is connected to the first end 56 of the shaft 54. The first end 56 of the shaft 54 is threadably connected via the ball 49 to the second end 52 of the screw 48. The second end 58 of the shaft 54 is connected to the first end 60 of the valve stem 14 via a bolt 61. The second end 62 of the valve stem is biased by a centering spring 64. A housing 71 covers the coupling 46, the screw 48, and the shaft 54. A means prevents rotation of the shaft 54. The means, shown here, is a slot 68 from the first end 56 to the second end 58 of the shaft 54; a pin 70 fits through the housing 71 and inside of the slot 6 to prevent the shaft 54 from rotating.

The motor 12 preferably has stator windings and a permanent magnet rotor. For example, a brushless direct-current motor offers good power characteristics and controlability. The sensor means 24 is connected to the rear of the motor 12 so that it can monitor the rotation of the rotor 42. Preferably, a non-contacting sensor, such as a resolver or optical encoder, is employed. The motor control means 16, as described in reference to FIGS. 1 and 2, receives the valve position signal from the sensor 24 via lines 72, the desired position signal from the means 22 via lines 74, and transmits a motor control signal to the windings 40 of the motor 12 via lines 76.

At equilibrium, the desired signal from the means 22 and the sensed signal from the sensor means 24 do not produce an error signal. Thus, the valve is in the desired position, and the following equation is satisfied:

$$K_{p1} X_d/N = K_{p2} S + K_v dS/dt$$

When the desired position signal changes, an error signal is produced by the motor control means 16, and is responsive to the following equation:

$$e = K_{p1} X_d/N - (K_{p2} S + K_v dS/dt)$$

This signal is modified by the the driver portion of the motor control means 16 such that it may be applied to the stator windings 40 of the motor 12 to operate the motor the required direction and at a required speed to effect the desired valve stem position change. As the motor 12 rotates, the screw 48 moves the non-rotatable shaft 54 in the axial direction. Since the shaft 54 is connected to the valve stem 14, it also moves in the axial direction. As the motor 12 rotates, the sensed position signal approaches the desired position signal, and the error signal decreases until equilibrium is again achieved and the valve is positioned as desired. Furthermore, should the motor or motor control fail, the centering spring 64 returns the valve to a safe position. This is allowed due to the free rotation of the brushless direct-current motor. Many other motors, including stepper motors, do not have this feature.

The embodiment described in reference to FIG. 3 is considered to be best mode due to its simplicity, efficiency, and cost effectiveness. It should be realized, however, that a rotatably actuatable valve could easily replace an axially moveable valve. With a gearing change to produce rotatable movement, the electronic control could easily be applied to a rotatably actuatable valve.

INDUSTRIAL APPLICABILITY

Large work vehicles, such as earthmovers, require hydraulic power to operate work implements. A typical hydraulic system has a fluid reservoir, fluid lines, valves, pumps, and a pilot system. Electrically powered mechanical valve actuators can replace the pilot systems in many instances. Electronic controls are then applied more effectively to control the operation of the hydraulic muscle.

An electronic valve actuator, as described previously, is mounted to the main valve stem of each valve previously controlled by a pilot valve. An electronic joystick substitutes for the mechanical linkage necessary to actuate the pilot valve. In short, the pilot pumps, the pilot valves, the associated fluid lines, and the linkages are all replaced by alternator power wires, electronic valve actuators, wires, and joysticks, respectively. This replacement produces better controlability and lower power consumption at less expense.

The joystick transmits signals representative of a desired valve position to the motor control means. A sensor monitors the valve stem position and transmits a signal to the motor control means in response to the sensed position. As the operator moves the joystick, he is requesting a desired movement from a work implement. Therefore, the main stem of the hydraulic valve or valves responsible for causing such movement must be displaced accordingly. When the desired position signal changes, the motor control means attempts to reduce the error signal produced to zero. In order to reduce the error term the valve stem position must be altered such that the sensed signal approaches the desired signal. The motor is energized, thus turning the ball screw, and efficiently moving the shaft and valve stem in the desired direction. Using a position term and a rate of change term, the valve stem movement, and in turn the work implement movement, is controlled in a quick and smooth fashion.

Other aspects, objects, and advantages of this invention can be obtained from a study of the drawings, the disclosure, and the appended claims.

We claim:

1. An apparatus for positioning a valve stem, comprising:
   a motor;
   means for transferring mechanical power from said motor to said valve stem and moving said valve stem;
   signal means for producing a signal representative of desired valve stem position;
   sensor means for determining the position of said valve stem and producing a signal in response to said sensed position;
   motor control means for receiving said sensed position signal and said desired position signal, determining the rate of change of said sensed position signal, producing an error signal responsive to a difference between said desired position signal and a summation of said sensed position signal and the rate of change of said sensed position signal, and transmitting a motor control signal in response to said error signal.

2. The apparatus, as set forth in claim 1, wherein said motor includes a wound stator and a permanent magnet rotor.

3. The apparatus, as set forth in claim 1, wherein said sensor means monitors the output of said motor.

4. The apparatus, as set forth in claim 1, wherein said motor control means includes a processor and a driver.

5. An apparatus for positioning a valve stem, comprising:
   a motor;
   means for transferring mechanical power from said motor to said valve stem and moving said valve stem;
   signal means for producing a signal representative of desired valve stem position;
   sensor means for determining the position of said valve stem and producing a signal in response to said sensed position;
   processing means for receiving said sensed position signal and said desired position signal, differentiating said sensed position signal, and producing an error signal responsive to a difference between said desired position signal and a summation of said sensed position signal and said differentiated sensed position signal;
   driver means for transmitting a motor control signal to said motor in response to said error signal, and adjusting said difference between said converted signals to zero.

6. An apparatus, as set forth in claim 5, wherein said motor includes a wound stator and a permanent magnet rotor.

7. The apparatus, as set forth in claim 6, wherein said stator windings receive said motor control signal.

8. The apparatus, as set forth in claim 6, wherein said sensor means monitors rotation of said rotor of said motor and is free from contact with said rotor.

9. The apparatus, as set forth in claim 5, wherein said motor is a brushless direct-current motor.

10. The apparatus, as set forth in claim 5, wherein said motor control signal is a three-phase power signal.

11. The apparatus, as set forth in claim 5, wherein said motor control signal is a four-phase power signal.

12. The apparatus, as set forth in claim 5, wherein said processing means produces a direction signal in response to said received signals.

13. The apparatus, as set forth in claim 12, wherein said driver means receives said direction signal and alters said motor control signal in response thereto.

14. An apparatus for positioning an axially moveable valve stem, comprising:
   a motor having a stator and a rotor and being positioned in axial relation to said valve stem, said rotor having a connectable end;
   a ball-screw mechanism having a ball and a screw, said screw having first and second ends and being connected on said first end to the connectable end of said rotor;
   a substantially circular shaft having first and second ends and being connected on the first end to the ball and being threadably connected via said ball on said first end to said second end of said screw and being connected on said second end to one end of said valve stem;
   means for preventing rotation of said shaft;
   signal means for producing a signal representative of desired valve stem position;
   sensor means for determining the position of said valve stem and producing a signal in response to said sensed position;
   processing means for receiving said sensed position signal and said desired position signal, differentiating said sensed position signal, converting said received signals and said differentiated signal into like units, and producing an error signal responsive to a difference between said converted signals;
   driver means for transmitting a motor control signal to said motor in response to said error signal, and adjusting said difference between said converted signals to zero.

* * * * *